United States Patent [19]

Kim

[11] Patent Number: 5,767,979
[45] Date of Patent: Jun. 16, 1998

[54] LED LIGHT SOURCE APPARATUS FOR SCANNER AND METHOD FOR CONTROLLING THE SAME

[75] Inventor: Yong-Geun Kim, Suwon, Rep. of Korea

[73] Assignee: SamSung Electronics Co., Ltd., Suwon, Rep. of Korea

[21] Appl. No.: 859,330

[22] Filed: May 20, 1997

[30] Foreign Application Priority Data

May 22, 1996 [KR] Rep. of Korea ............. 17534/1996

[51] Int. Cl.$^6$ .................. H04N 1/00; G01D 90/42
[52] U.S. Cl. .......................... 358/296; 347/237
[58] Field of Search ........................ 358/296, 474, 358/480, 482, 483; 347/130, 233, 237, 238; 250/208.1; 348/272, 294; 372/29–33

[56] References Cited

U.S. PATENT DOCUMENTS

| | | | |
|---|---|---|---|
| 4,727,428 | 2/1988 | Futatusgi et al. | 358/296 |
| 4,780,731 | 10/1988 | Creutzmann et al. | 358/296 X |
| 4,831,395 | 5/1989 | Pham et al | 347/237 |
| 4,837,587 | 6/1989 | Ng | 358/296 X |
| 4,982,204 | 1/1991 | Van Peteghem et al. | 346/108 |
| 5,034,757 | 7/1991 | Godlove | 358/296 X |
| 5,099,192 | 3/1992 | Thayer et al. | 347/237 |
| 5,264,868 | 11/1993 | Hadley et al. | 347/237 |
| 5,389,953 | 2/1995 | Agar et al. | 347/237 |
| 5,414,534 | 5/1995 | Bindon | 358/483 |
| 5,453,777 | 9/1995 | Pensavecchia et al. | 347/234 |
| 5,514,865 | 5/1996 | O'Neil | 250/208.1 |
| 5,585,836 | 12/1996 | Pham et al. | 347/237 |

*Primary Examiner*—Eric Frahm
*Attorney, Agent, or Firm*—Robert E. Bushnell, Esq.

[57] ABSTRACT

A light source apparatus for a scanner secures a uniform illuminance. The light source apparatus includes a plurality of light emitting diodes arranged at regular intervals. The light emitting diodes disposed at the periphery are provided with a higher voltage and the light emitting diodes disposed at near the center are provided with a lower voltage, so as to compensate for a loss of the light beam at the outer side. Further, the light source apparatus includes a constant-current source for providing the light emitting diodes with a constant current.

6 Claims, 4 Drawing Sheets

5,767,979

LED LIGHT SOURCE APPARATUS FOR SCANNER AND METHOD FOR CONTROLLING THE SAME

CLAIM OF PRIORITY

This application makes reference to, incorporates the same herein, and claims all benefits accruing under 35 U.S.C. §119 from an application for Light Source Apparatus For Scanner And Method For Controlling the Same earlier filed in the Korean Industrial Property Office on 22 May 1996 and there duly assigned Ser. No. 17534/1996.

FIELD OF THE INVENTION

The present invention relates generally to a scanner, and more particularly, to a light source apparatus for a scanner capable of securing a uniform illuminance and a method for controlling the same.

BACKGROUND OF THE INVENTION

In common, a scanner is widely employed into an electrophotographic printer, a copying machine, a facsimile, and the like. A laser diode or a light emitting diode is generally used for a light source of such a scanner.

U.S. Pat. No. 5,585,836 for an Electrophotographic Image Recording Apparatus and Method With Correction For Bow in Placement of Recording Elements to Pham et al. discloses a method and a circuit for correcting the bowing that occurs from an LED scanner. FIGS. 8 and 9 show the bowing and the circuit for correcting the bowing.

U.S. Pat. No. 4,780,731 for an Electrophotographic Printer Comprising an Exposure Energy Correcting Means For the Optical Character Generator to Creutzmann et al. Describes how, upon call-in of a balancing routine, an automatic balancing of the light emitting elements occurs by use of a photo-element which acquires a radiant intensity transmitted onto the recording medium by every light emitting element under prescribed normal operating conditions, and which supplies corresponding signals to a control means coupled to the light emitting element. This invention is not directed towards the bowing or shading correction problem.

U.S. Pat. No. 5,034,757 for an LED Printing Array Current Control to Godlove discloses an LED printing array current control circuit that controls the current delivered to each LED in a scanning array. The resistor network ensures that the inactivated LED output are all at constant level. The resistor network is used to reduce the uniformity problem inherent in LED write bars because of the design of the drive circuit used with the LED array. Godlove '757 does not demonstrate a circuit of reducing the bowing or shading correction problem. In addition, Godlove '757, as shown in FIGS. 1 and 2, has a transistor is placed in series with the resistors and the LED's.

SUMMARY OF THE INVENTION

It is therefore an object of the present invention to provide a light source apparatus for a scanner capable of securing a uniform illuminance at a document as a whole and a method for controlling the same.

According to an aspect of the present invention, a light source apparatus for a scanner includes a plurality of light emitting diodes arranged at regular intervals. The light emitting diodes disposed at an outer side are provided with a higher voltage and the light emitting diodes disposed at an inner side are provided with a lower voltage.

Further, the light source apparatus includes a constant-current source for providing the light emitting diodes with a constant current. When the scanner is being used, light emitting diodes near the edge of a diode array illuminate with greater intensity than diodes near the center of the array. This results in uniform illumination of the document without crowding diodes in some areas and not in other areas.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
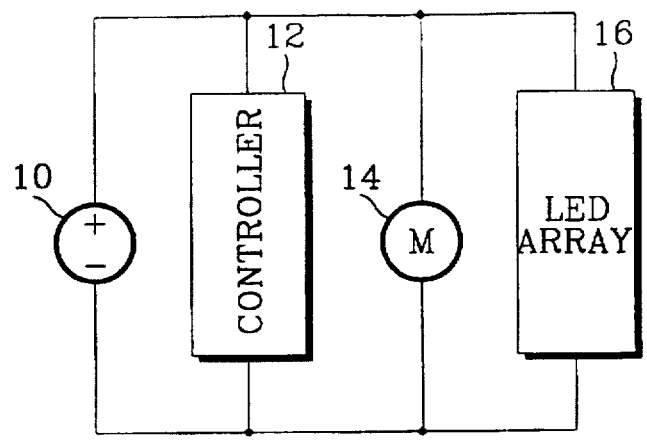
FIG. 1 is block diagram of a light source apparatus for a scanner according to the prior art.

Referring to FIG. 1, a known light source apparatus for a scanner includes a power source 10, a controller 12, a motor 14, and a light source 16. As illustrated, the power source 10 provides each part of the light source apparatus with a supply voltage, and the controller 12 controls an overall operation of the scanner. The motor 14 is to mechanically drive the light source 16. Further, the light source 16 is comprised of a light emitting diode (referred to as LED hereinafter) array 16.

Figure 2:
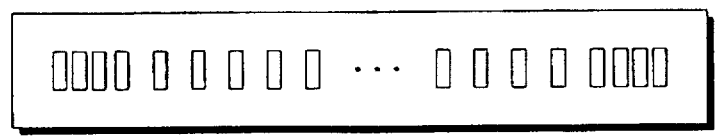
FIG. 2 is a diagram showing a layout of a light emitting diode array shown in FIG. 1.
Figure 3:
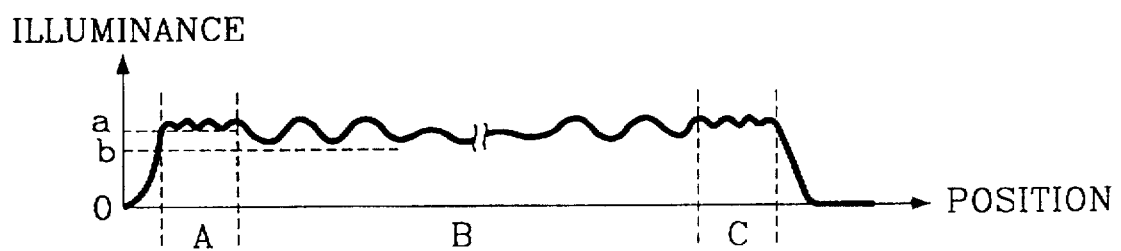
FIG. 3 is a curve showing an illuminance of an optical beam emitted from the light emitting diode array shown in FIG. 2.

Referring to FIG. 2, the LED array 16 includes a plurality of LEDs which are more densely arranged at the outer sides than at the middle, so as to compensate for an optical loss at the outer sides. Referring to FIG. 3, there is shown an illuminance of an optical beam emitted from the LED array 16, in case that the LED array 16 emits the optical beam, without any optical loss, on a document for a predetermined time. As illustrated in the drawing, the illuminance has a longer variation cycle at the middle B than at the outer sides A and C of the LED array 16. Further, the minimum illuminance at the middle B has a value b, and the minimum illuminance at the outer sides A and C has a value a, in which the value a is higher than the value b.

Figure 4:
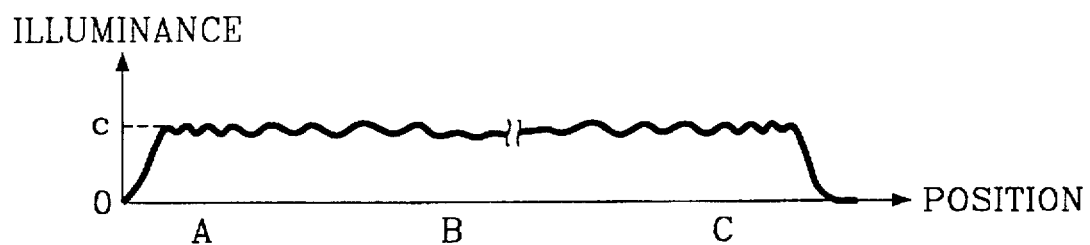
FIG. 4 is a curve showing an illuminance of an optical beam irradiated on a document.

Referring to FIG. 4, there is shown an illuminance of the optical beam, in case that the optical beam with the illuminance shown in FIG. 3 is actually irradiated on the document. As can be appreciated from the drawing, the illuminance is maintained uniformly at positions A, B, and C of the document, each corresponding to the positions A, B, and C of the LED array 16. Namely, since the illuminance of the LED array 16 is higher at the outer sides than at the middle as shown in FIG. 3, the illuminance of the optical beam irradiated on the document is maintained uniformly at positions A, B, and C.

However, in the above mentioned prior art light source apparatus for a scanner, a surge noise due to an instantaneous overvoltage or overcurrent which may be caused by an instantaneous operation of the controller 12 and the motor 14 upon a power-up is apt to flow into a power supply line of the light source apparatus. As a result, the driving voltage of the light source apparatus may become unstable, which causes the illuminance of the optical beam to become unstable.

Figure 5:
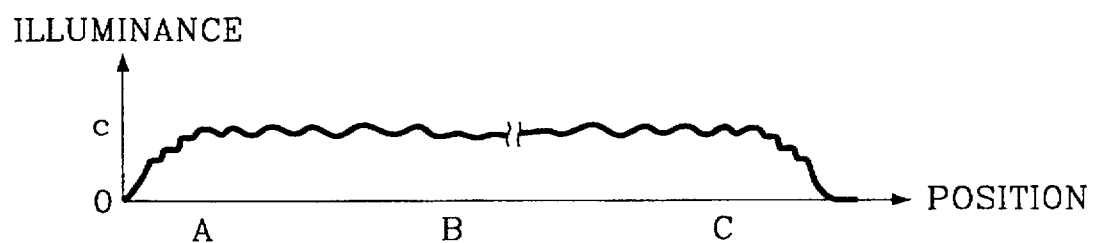
FIG. 5 is a curve showing an actual illuminance of an optical beam irradiated on a document.

Further, in the above mentioned prior art light source apparatus, increasing a density of the LEDs at the outer sides of the LED array 16 may be limitative because of the physical size of the LEDs. Thus, it may be difficult to completely compensate for the loss of the optical beam irradiated on the outer sides of the document. In practice, therefore, the illuminance is lowered at the outermost sides of the document, as shown in FIG. 5. Therefore, when the light source apparatus scans the document, the illuminance of the optical beam is nonuniform.

Figure 6:
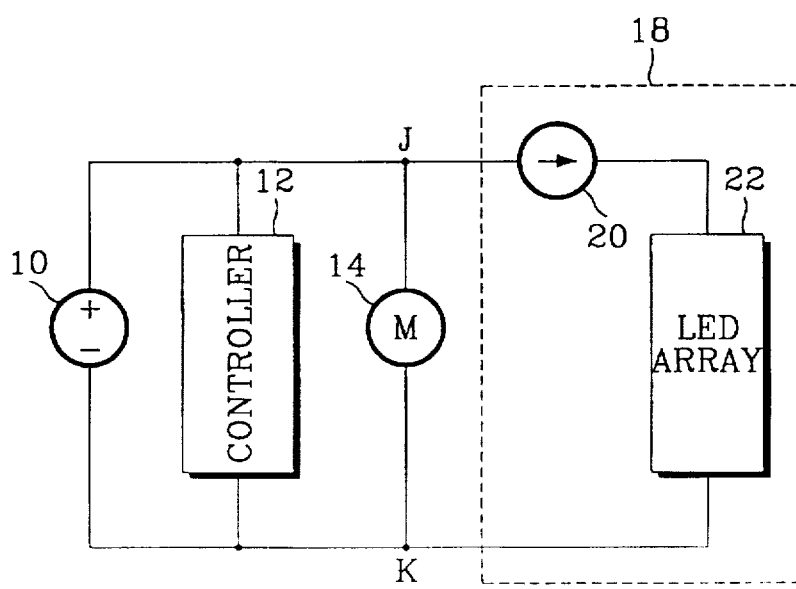
FIG. 6 is a block diagram of a light source apparatus for a scanner according to an embodiment of the present invention.

A preferred embodiment of the present invention will now be described in detail. Referring to FIG. 6, a light source apparatus for a scanner according to a preferred embodiment of the present invention includes a power source 10, a controller 12 for controlling an overall operation of the scanner, a light source 18, and a motor 14 for mechanically driving the light source 18. The light source 18 connected to nodes J and K includes a constant-current source 20 and an LED array 22.

Figure 7:
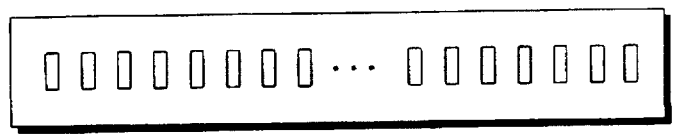
FIG. 7 is a diagram showing a layout of a light emitting diode array shown in FIG. 6 according to the present invention.

Referring to FIG. 7, the LED array 22 includes a plurality of LEDs which are arranged at regular intervals. According to the present invention, in order to compensate for a loss of the optical beam at the outer sides of the LED array 22, the LEDs disposed at the outer ends have the higher brightness than those disposed at the middle.

Figure 8:
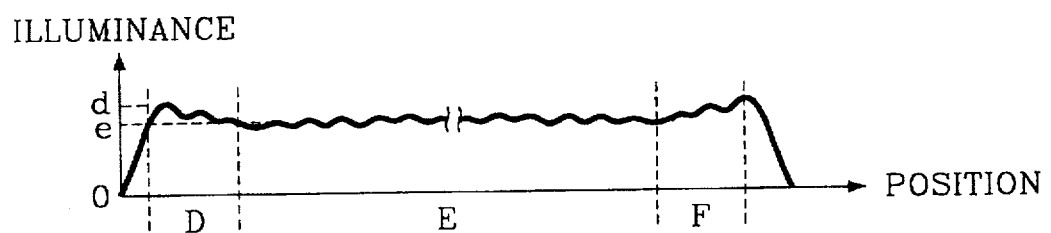
FIG. 8 is a curve showing an illuminance of an optical beam emitted from a light emitting diode array shown in FIG. 6.

Referring to FIG. 8, there is shown an illuminance of the optical beam emitted from the LED array 22. As illustrated, the LED array 22 has the maximum illuminance d at the outer sides D and F, and has the minimum illuminance e at the middle E. More specifically, the LEDs of the LED array 22 have the increasing illuminance near the ends.

Figure 9:
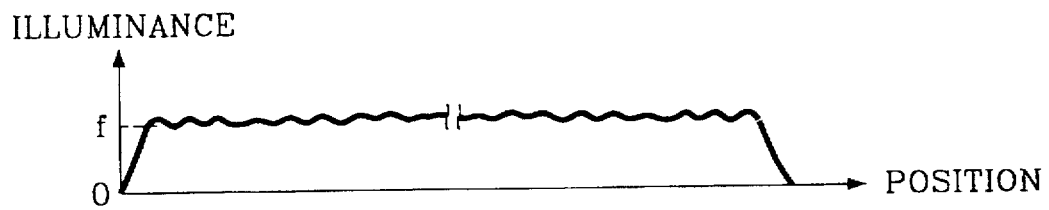
FIG. 9 is a curve showing an actual illuminance of an optical beam irradiated on a document.

Referring to FIG. 9, there is shown an illuminance of an optical beam irradiated on a document, in case that the document is scanned by the optical beam emitted from the LED array 22 with the illuminance shown in FIG. 8. As can be appreciated from FIG. 9, the illuminance of the optical beam irradiated on the document is uniform as a whole. In this manner, the LED array 22 can completely compensate for the loss of the optical beam at both ends of the document.

Figure 10:
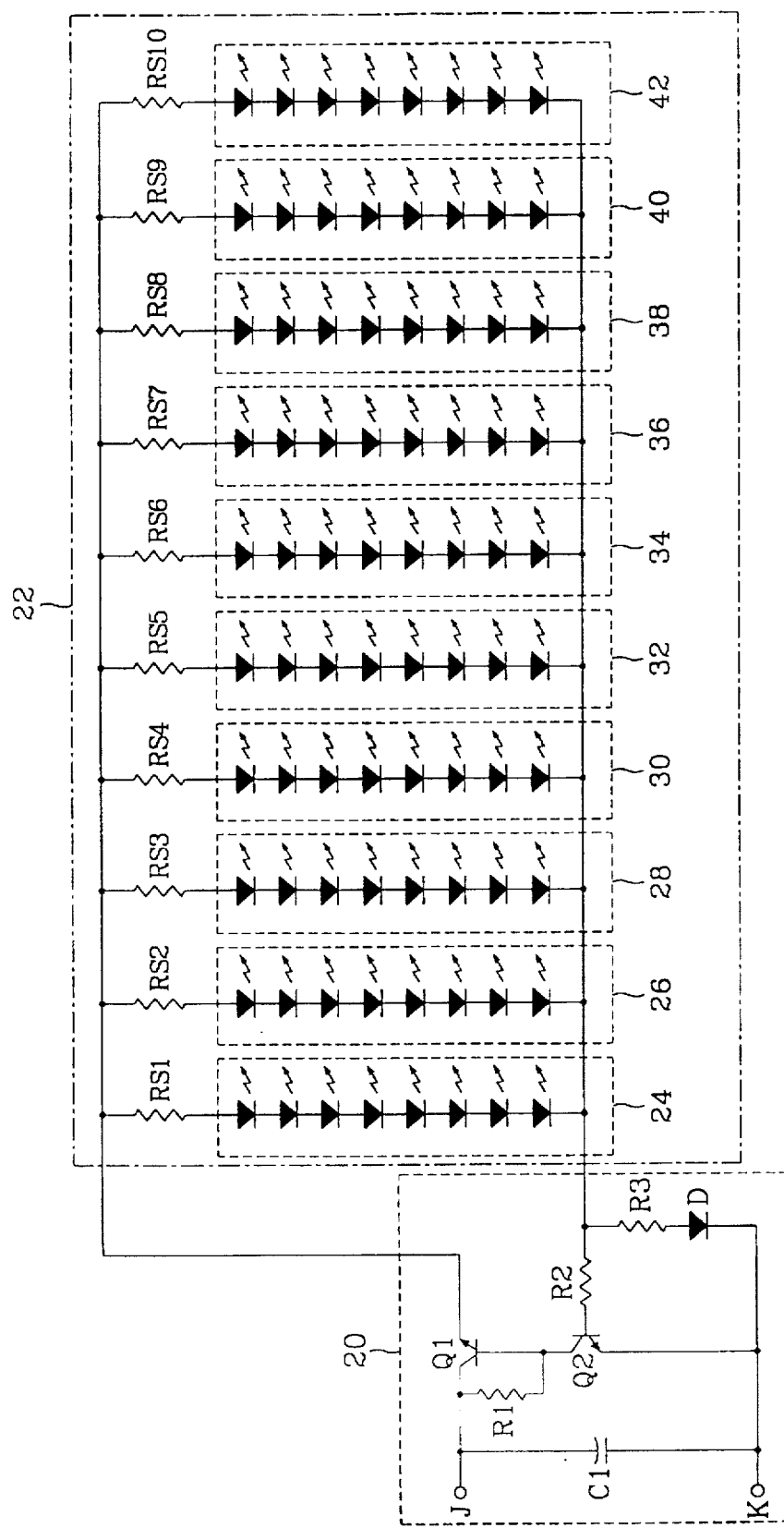
FIG. 10 is a detailed circuit diagram of a light source shown in FIG. 6.

Referring to FIG. 10, the light source 18 connected to the power source 10 via the nodes J and K includes the constant-current source 20 and the LED array 22. The constant-current source 20 for supplying a constant-current to the LED array 22 includes a bypass capacitor C1, a first transistor Q1 and a second transistor Q2. The bypass capacitor C1 is connected between the output nodes J and K of the power source 10. The first transistor Q1 has a collector connected to the node J and an emitter connected to an end of the LED array 22. The first transistor Q1 includes a bias resistor R1 connected between the collector and a base thereof for providing a bias voltage. Another end of the LED array 22 is connected to the node K via a resistor R3 and a diode D. The diode D is used for dropping the voltage by a particular level. Further, the second transistor Q2 has a collector connected to the base of the first transistor Q1 and an emitter connected to the node K. A base of the second transistor Q2 is connected to another end of the LED array 22 via a resistor R2.

It is noted that a voltage obtained by adding up a base-emitter voltage $V_{Q2(B-E)}$ of the second transistor Q2 and a voltage drop $V_{R2}$ across the resistor R2 coincides with a voltage drop $V_{R3}+V_D$ across the resistor R3 and the diode D. Further, a current flow $I_{R1}$ through the bias resistor R1 coincides with a current value $I_{Q2(C-E)}+I_{Q1(B-E)}$ obtained by adding up a collector-emitter current $I_{Q2(C-E)}$ of the second transistor Q2 and a base-emitter current $I_{Q1(B-E)}$ of the first transistor Q1. These relationships can be represented by:

$$V_{R3}+V_{Df}=V_{R2}+V_{Q2(M-E)}$$

$$I_{R1}=I_{Q2(C-E)}+I_{Q1(B-E)}$$

From the above equations, it can be appreciated that the second transistor Q2 controls a base current of the first transistor Q1 according to variation of the current flow through the LED array 22, so that the current source 20 may provide the LED array 22 with the constant current. Therefore, with use of the constant-current source 20, the light source apparatus for a scanner according to the present invention may not influenced by the surge noise due to an instantaneous overvoltage or overcurrent upon a power-up.

Furthermore, the LED array 22 according to a preferred embodiment of the present invention includes a plurality of LED sets 24, 26, 28, 30, 32, 34, 36, 38, 40, and 42 connected in parallel to one another, each of the LED sets having a plurality of LEDs connected in series. The LED sets 24, 26, 28, 30, 32, 34, 36, 38, 40, and 42 are connected in common to the constant-current source 20 via brightness setting resistors RS1, RS2, RS3, RS4, RS5, RS6, RS7, RS8, RS9, and RS10, respectively. The brightness setting resistors have different resistances from one another. It can be understood that an LED set connected to the brightness setting resistor with a lower resistance will emit the light beam of a higher brightness. Thus, in order to allow the LED sets disposed at the outer sides of the LED array 22 to emit the optical beam of the higher brightness, resistance values of the brightness setting resistors should be set as represented in the following:

$$RS1=RS10<RS2=RS9<RS3=RS8<RS4=RS7=RS5=RS6$$

That is, the brightness setting resistors have the lower resistances as they go to the outer ends of the LED array 22. Therefore, the LED array 22 according to the present invention emits the optical beam of the higher brightness at the outer ends, thereby compensating for the loss of the optical beam at both ends of the LED array 22.

Although a preferred embodiment of the present invention has been described in detail hereinabove, it should be clearly understood that many variations and/or modifications of the basic inventive concepts herein taught which may appear to those skilled in the art will still fall within the spirit and scope of the present invention as defined in the appended claims.

What is claimed is:

1. A method for controlling a light source apparatus for a scanner, characterized by:

arranging a plurality of light emitting diodes at regular intervals; and providing the light emitting diodes disposed at an edge with a higher voltage and providing the light emitting diodes disposed at a center with a lower voltage.

2. A method for controlling a light source apparatus for a scanner according to claim 1, characterized by comprising a constant-current source for providing said light emitting diodes with a constant current.

3. A light source apparatus for a scanner, comprising:

a plurality of light emitting diodes arranged at regular intervals;

a constant-current source for providing said light emitting diodes with a constant current;

a motor for moving said light emitting diodes along a page being scanned;

a controller for controlling an overall operation of said scanner; and a plurality of brightness setting resistors each being connected between a corresponding light emitting diode and said constant-current source, said brightness setting resistors having different resistances from one another.

4. A light source apparatus for a scanner according to claim 3, wherein said brightness setting resistors connected to the light emitting diodes disposed near edges of said plurality of light emitting diodes have lower resistances than the brightness setting resistors connected to the light emitting diodes disposed away from said edges of said plurality of light emitting diodes.

5. A light source for a scanner, comprising:

a plurality of light emitting diode sets arranged in parallel at regular intervals, each said light emitting diode set comprising a plurality of light emitting diodes;

a plurality of brightness setting resistors, each resistor being connected to a corresponding one of said plurality of light emitting diode sets, said brightness setting resistors having different resistances from one another; and a constant-current source for providing said light emitting diode sets with a constant current.

6. A light source for a scanner according to claim 5, wherein the brightness setting resistors connected to the light emitting diode sets disposed at edges of said plurality of light emitting diode sets have lower resistances, and the brightness setting resistors connected to the light emitting diode sets disposed at a center of said light emitting diode sets have higher resistances.

* * * * *